Patented Dec. 4, 1945

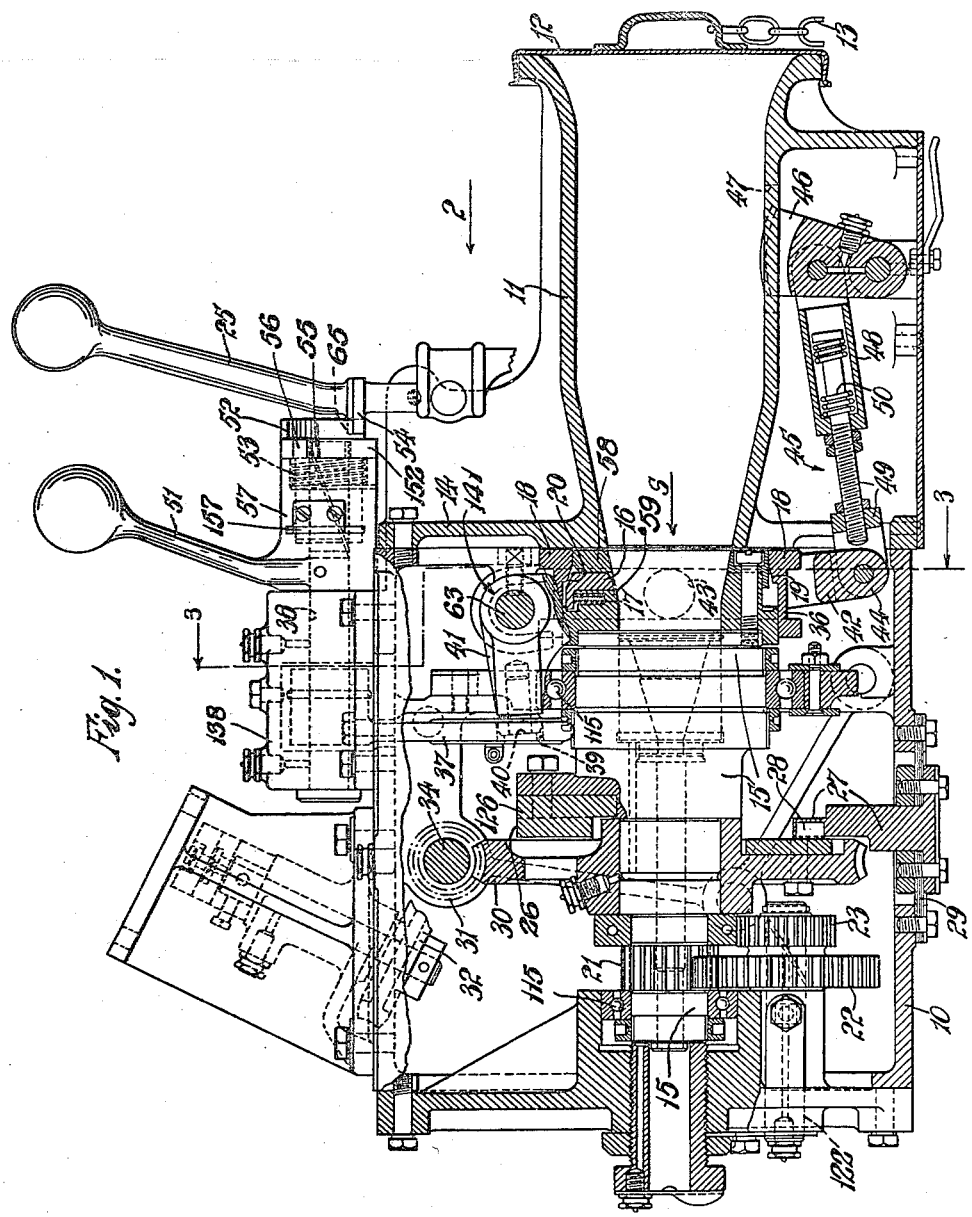

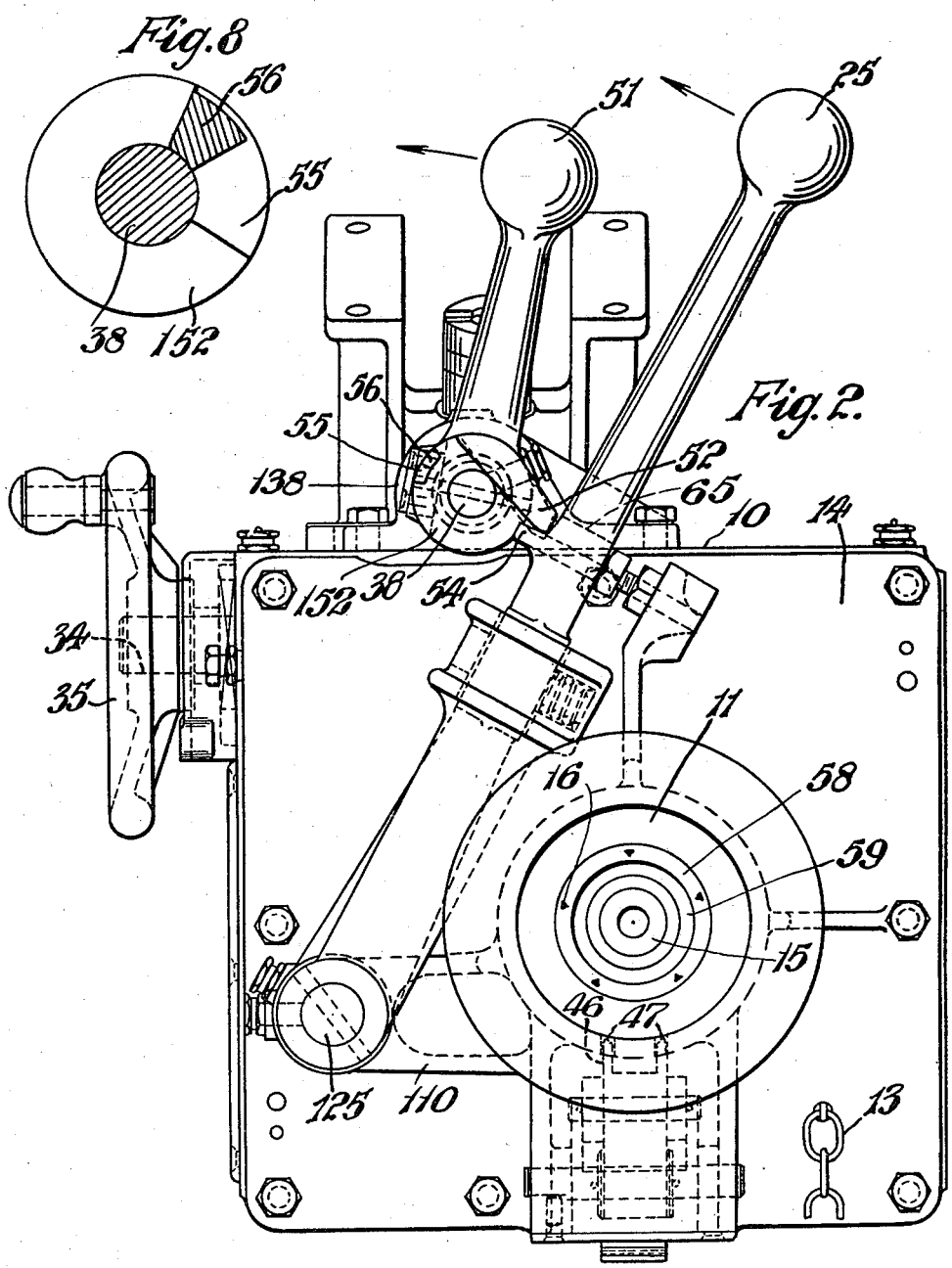

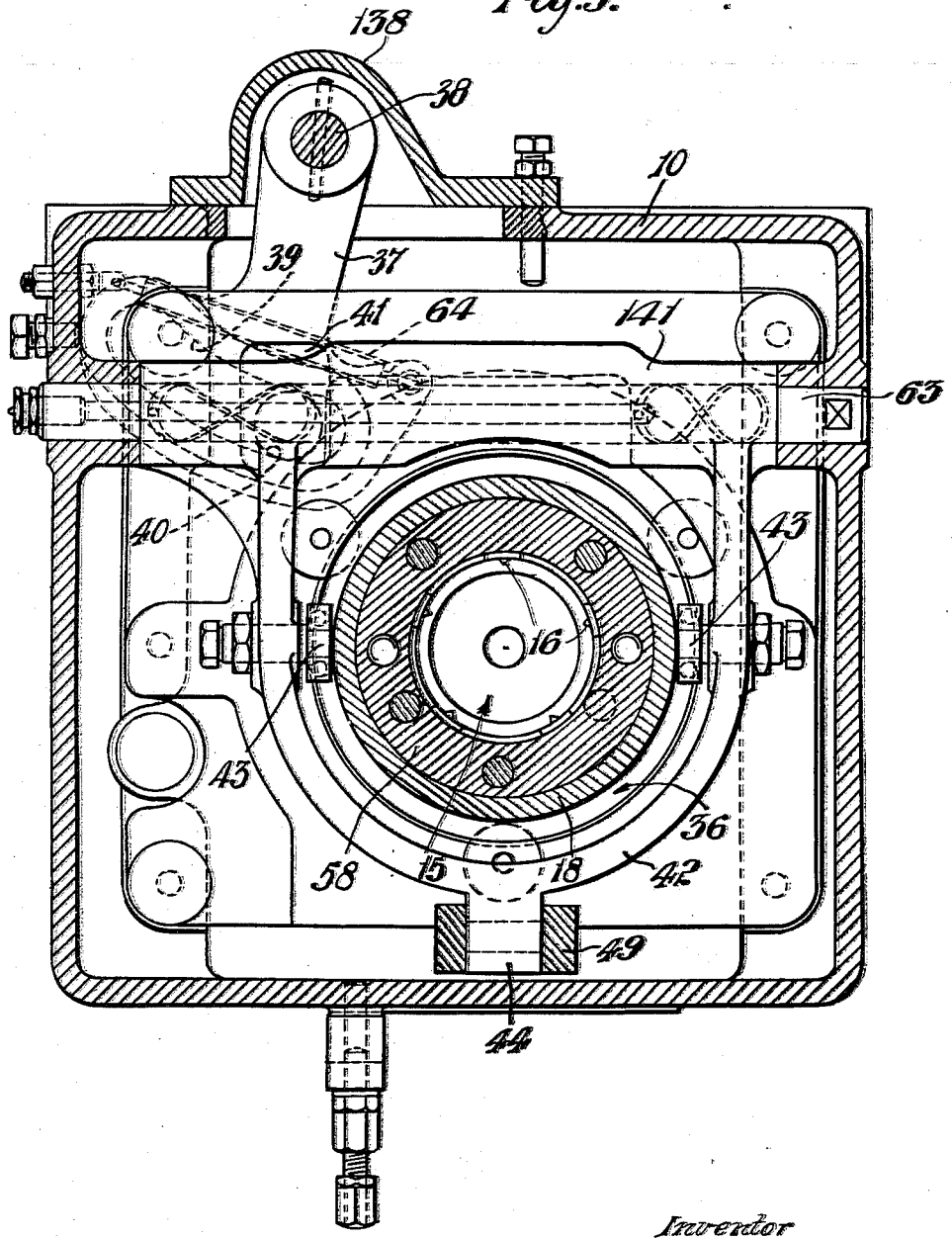

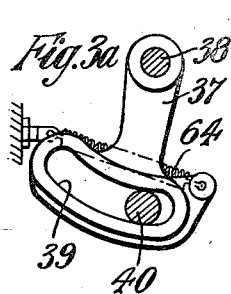
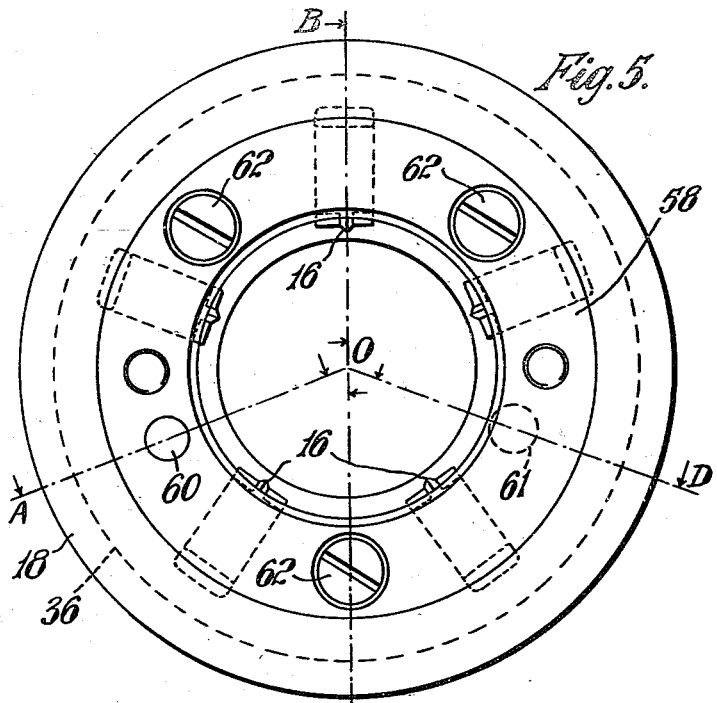
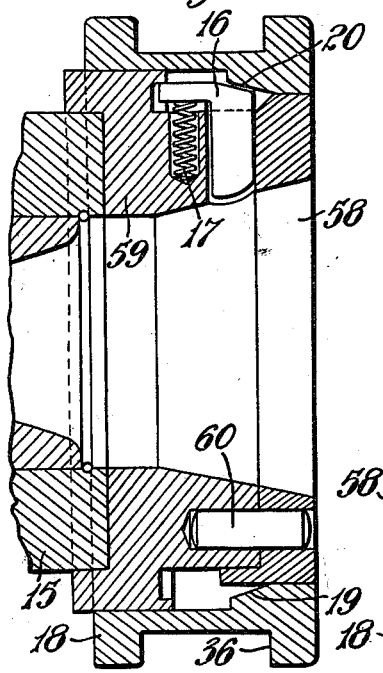
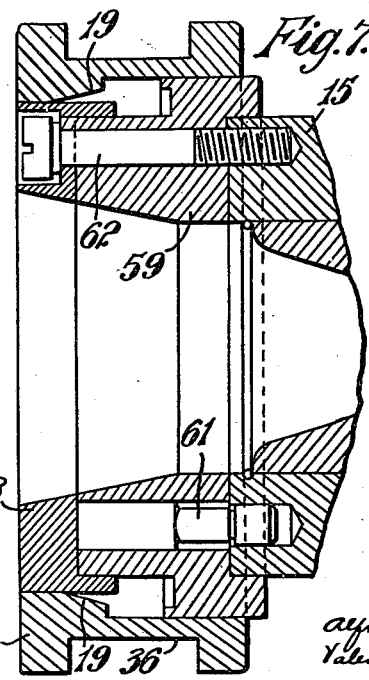

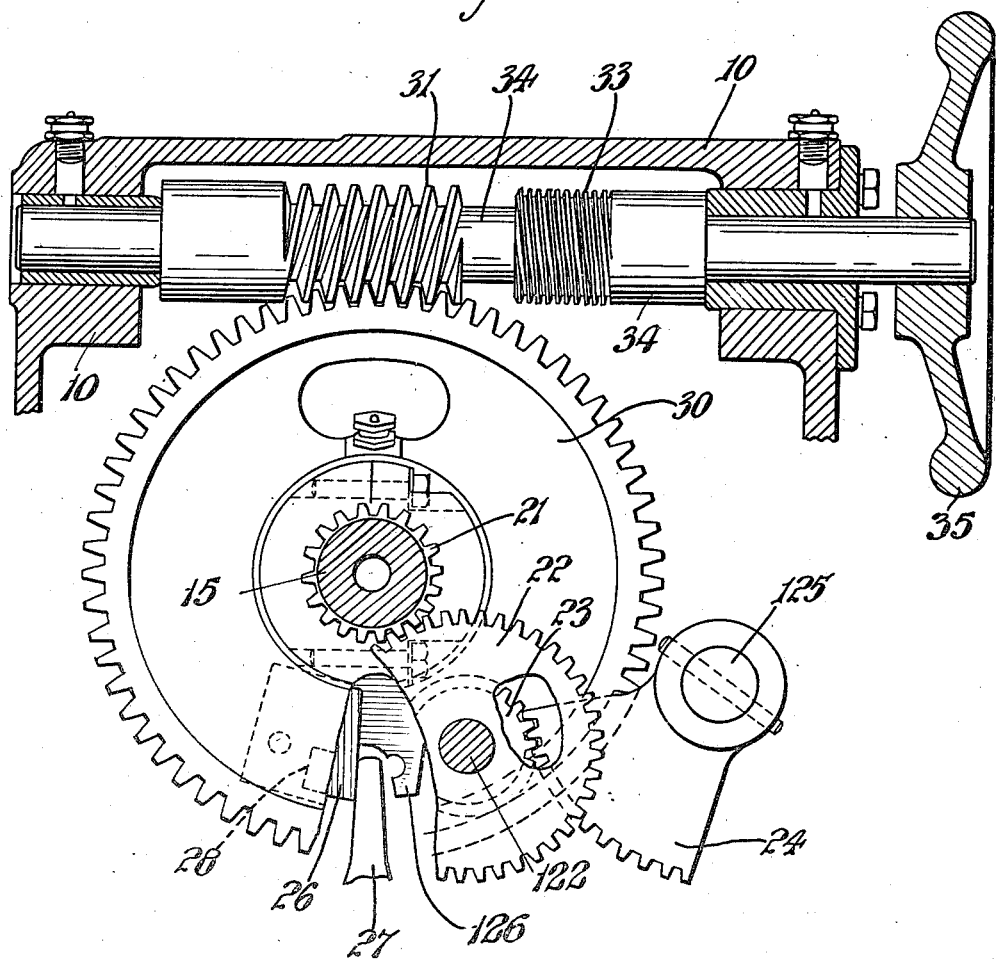

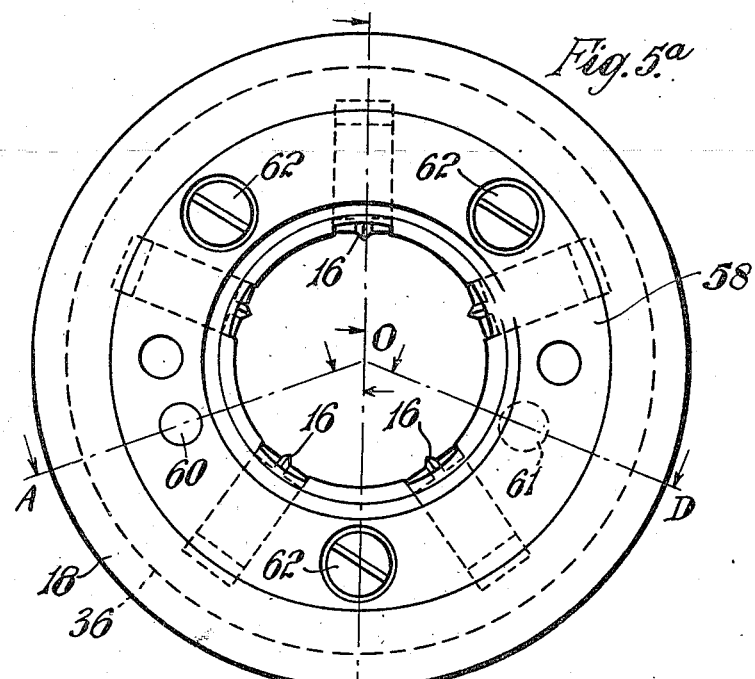
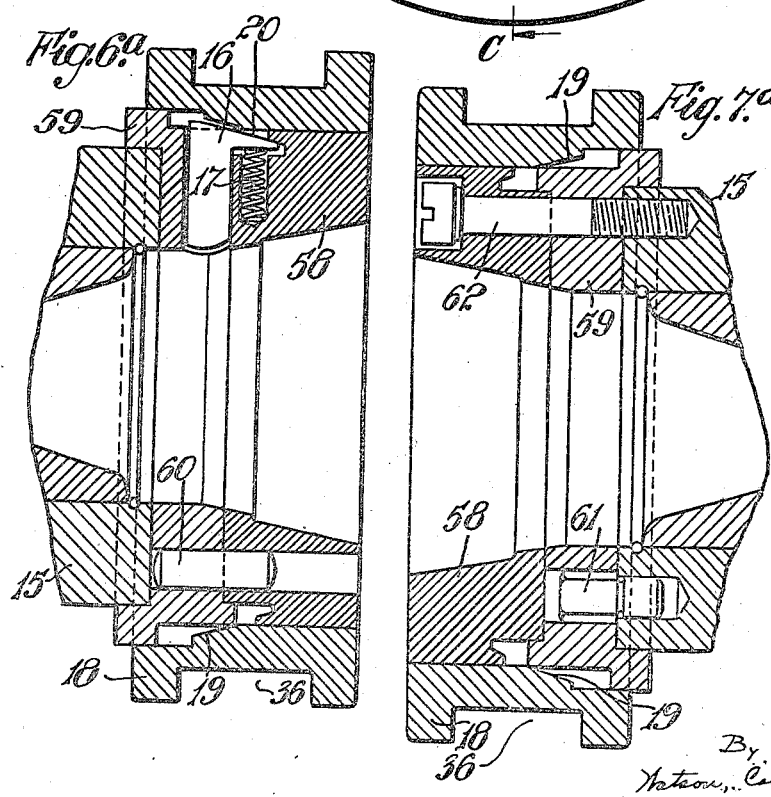

2,390,382

UNITED STATES PATENT OFFICE 2,390,382

FUSE-SETTING APPARATUS

Alfred Henry Musson, Woolwich, London S. E. 18, and Valentine Pearce Harvey, Deptford, London S. E. 8, England Application July 2, 1941, Serial No. 400,850
In Great Britain July 2, 1940

7 Claims. (Cl. 86—23)

This invention concerns improvements in or relating to fuse-setting apparatus of the kind in which a movable fuse-element is gripped and rotated the desired angular extent by a rotatable gripping-device having sharp gripping members adapted to bite into the material of the movable fuse-element and positively engage the same (for example a device comprising a number of knife edges). Such a fuse-setting apparatus is referred to hereinafter as "a fuse-setting apparatus of the kind described."

According to the present invention there is provided in a fuse-setting apparatus of the kind having a gripping device comprising sharp gripping members adapted to engage and grip the movable element of a a fuse, the combination of a driving lever operably coupled to the gripping device to effect angular movement thereof, a control lever, means operably coupled to the control lever and adapted on movement of the latter to hold a shell against angular movement and to move the gripping members inwards so that they can grip the movable fuse-element, said means including a wedge-like slidable member adapted on movement in one direction along the axis of rotation of the gripping device to force the sharp gripping members inwards, a catch to prevent operative movement of the driving lever and a lost motion operative connection between the catch and the control lever, whereby the catch is released only after the control lever has moved a sufficient distance to cause the shell to be held and the movable fuse element to be gripped. The wedge-like slidable member may comprise an internally coned ring or sleeve in association with which a bellcrank lever having a forked arm is arranged so that the forks cooperate with the ring or sleeve, whereby movement of the bellcrank lever effects axial movement of the ring and wherein the other arm of the bellcrank lever is adapted to egage a cam movable with the control lever, whereby on actuation of the control lever the cam causes movement of the bellcrank lever.

The means to hold a shell against movement may comprise an angularly movable eccentric cam having components of movement in the general direction of the longitudinal axis of a shell and connected with the control lever by an extensible coupling which permits further movement of the control lever after said cam has effectively engaged a shell. This extensible coupling may be located between the said eccentric cam and the said bellcrank lever.

The wedge-like member, if formed as a sleeve, may be provided with an internal conical surface which is adapted to cooperate with sloping surfaces on said sharp gripping members to force the latter against the movable fuse-ring of a shell.

The angular movement of the gripping device for setting the fuse may be limited by engagement of means fixed thereto with a fixed stop (e. g. resiliently mounted) at one limit of its movement and with an adjustable stop (e. g. resiliently mounted) at the other limit of its movement; in such a case the adjustable stop may be movable in an arcuate path concentric with the axis of rotation of the gripping device in accordance with the momentary range reading.

Fuse-setting apparatus made in accordance with the present invention will now be described by way of example with reference to the accompanying drawings, in which:

Figure 1 is a side elevation, partly in section, of a fuse-setting apparatus.

Figure 2 is an end view of Figure 1, looking in the direction of the arrow 2.

Figure 3 is a section on the line 3—3 Figure 1 but with certain parts shown in full.

Figure 3a shows a detail of Figure 3, but drawn on a reduced scale.

Figure 4 is a detail view showing some of the gearing.

Figure 5 is an end view of the gripping-device drawn to an enlarged scale.

Figure 6 is a composite section on the lines AO—OB, Figure 5, looking in the direction of the arrows.

Figure 7 is a composite section on the line CO—OD, Figure 5, looking in the direction of the arrows.

Figures 5a, 6a, and 7a are views similar to the Figures 5, 6, and 7, but showing a gripping device for another kind of fuse.

Figure 8 shows a diagram of a detail.

Referring to the drawings, a casing 10 has secured thereto a hollow support 11 to receive and to locate a shell in the manner described below. A cover 12 is arranged to be clipped over the open mouth of the hollow support when the apparatus is not in use. The cover is secured by a chain 13 to the plate 14 by which the hollow support is secured to the casing 10.

A rotatable sleeve 15 is mounted in bearings 115, Figure 1, fitted in the casing 10 so that the axis of rotation of the sleeve coincides with the axis of a shell in the support 11. The sleeve 15 is provided towards its left hand end, Figure 1, with gear teeth constituting a gear wheel 21 while at the right hand end, Figure 1, is attached a gripping device comprising two ring members 58 and 59 whose construction will be described in more detail later with reference to Figures 5, 6 and 7. The gripping device is provided with a number of radially mounted knives 16, the knife edges of which are directed inwardly. The knives 16 are radially slidable and are urged outwardly by springs 17. When the shell is in position in the apparatus, part of the body of the shell lies within the cylindrical portion of the hollow support 11 while the nose of the shell projects into the interior of the gripping device and the hollow tapering portion of the sleeve 15. Thus as will be seen in Figure 1, the dotted lines representing the hollow tapering portion of the sleeve 15, the full lines showing the interior of the gripping device and the tapering lines and parallel lines representing the interior of the member 11, correspond approximately to the contour of a shell. When the shell is properly positioned, the location of the knives 16 along the axis of the shell is such that they are disposed around the movable fuse-ring of the fuse. A slidable sleeve 18 encircling the knives has an internal conical surface 19 adapted to force the knives radially inwards when the sleeve is moved in the direction of the arrow S, Figure 1. The outer ends of the knives are suitably shaped as indicated by the reference numeral 20 to co-operate with the conical surface 19, so that when the slidable sleeve 18 is forced over the knives the latter are pressed into the movable fuse-ring and thereby grip the latter.

The rings 58 and 59, the knives 16 and the slidable sleeve 18 together constitute a gripping-device which is adapted to be rotated so as to rotate the movable fuse-ring. The mechanism to rotate the gripping-device comprises a gear wheel 22 arranged to mesh with gear-teeth 21 on the rotatable sleeve 15. A further gear-wheel 23 is formed integrally with the gear-wheel 22, and the whole member is rotatable on a shaft 122 fixed in the casing. The gear wheel 22 is adapted to be actuated by a toothed quadrant 24, see Figure 4. The quadrant is fixed to a shaft 125 journalled in a bracket 110, Figure 2, forming part of the casing, and a hand lever 25 is fixed on the shaft 125 for moving the quadrant. This hand-lever will be referred to for convenience as the "driving-lever." The rotatable sleeve 15 has a lug 26, Figure 1, mounted on it. The lug 26 is of segmental form and is integral with a plate 126 by which it is attached to the sleeve 15, see Figure 4, where the parts 26 and 126 are cross-hatched. This lug is adapted to engage a fixed projection or stop 27 mounted on the casing 10 of the fuse-setting apparatus and is also adapted to engage an adjustable lug or stop 28. The stop 27 on the casing is resiliently mounted on flat springs 29 to reduce the shock of stopping the movement of the mechanism. Alternatively the adjustable stop 28 may be resiliently mounted or both the fixed stop 27 and the adjustable stop may be resiliently mounted. The adjustable stop 28 is mounted on a worm-wheel 30 mounted coaxially with the common axis of the shell and the rotatable sleeve 15. Thus on rotation of the worm wheel 30 the adjustable stop 28 is moved in an arcuate path concentric with the axis of rotation of the gripping-device. A worm 31 formed on a worm shaft 34 meshes with the worm-wheel 30, and another worm-wheel 32, Figure 1, meshes with another worm 33, Figure 4, formed on the same shaft 34. The worm wheel 32 is adapted to drive the mechanical pointer of the receiver-dial (not shown) coupled to a predictor. A driving-handle 35 (see Figures 2 and 4) is mounted on the shaft 34 in order to rotate the latter and so drive the mechanical pointer and also the worm-wheel 30 carrying the adjustable stop 28. Thus the adjustable stop 28 and the mechanical pointer are driven simultaneously and the stop 28 is thereby accurately located in the desired position for the particular fuse to be set.

The slidable sleeve 18 is provided with a circumferential groove 36. A lever 37, hereinafter called for convenience "a gripping lever," is fixed to a spindle 38 pivotally mounted in a bearing 138 fixed on the casing and the gripping lever 37 is provided with an eccentric slot 39 (see Figure 3A). A roller 40 on one arm 41 of a bell-crank lever 141 fits in the eccentric slot 39, the arrangement being such that on angular movement of the gripping-lever 37 the bell-crank lever 141 is moved angularly on its pivot. The lever 141 is pivoted on a cross shaft 63 fixed in the casing 10, see Figures 1 and 3. The other arm of the bell-crank lever 141 comprises a stirrup 42 encircling the slidable sleeve 18, the stirrup being provided with rollers 43 adapted to run in the circumferential groove 36 of the slidable sleeve (see Figure 3 where the stirrup is shown in full lines). Attached to a projection 44 at the end of the stirrup 42 is a link indicated generally by the reference 45, Figure 1, which is adapted to operate an eccentric cam 46 so as to cause the latter to grip the outer surface of the shell the fuse of which is to be set, and to prevent movement of the shell during the setting of the fuse. The cam 46 is angularly movable and has components of movement in the general direction of the longitudinal axis of a shell as can be seen from Figure 1. The cam is adapted to project through slots 47 (see Figure 2) in the hollow support 11. The link comprises two parts 48 and 49 having a compression spring 50 interposed between them. The gripping-lever 37 is operated by a control-handle 51 and, as the handle is moved in the direction of the arrow, Figure 2, the eccentric cam 46 is caused to press inwardly against the shell and further movement of the control-handle more or less compresses the compression spring 50 and so enables the stirrup 42 to be further moved until the conical surface 19 on the slidable sleeve 18 presses against and forces the knives 16 against the movable fuse-ring. The apparatus is now ready for setting the fuse of the shell and this is effected by operating the driving-lever 25 by moving it in the direction of the arrow, Figure 2, which causes the rotatable sleeve 15 to rotate.

The setting to be given to the fuse is determined by the angle between the fixed stop 27 and the instant position of the adjustable stop 28 which is under almost constant movement as the worm wheel 30 rotates in accordance with the rotation of the driving handle 35, which, as previously stated, also drives the pointer of the receiver-dial. As the angular movement of the sleeve 15, and therefore that of the gripping device, is limited by the movement of the lug 26 on the sleeve from initial contact with the fixed stop 27 into engagement with the adjustable stop 28, as described below, the "setting" given to the fuse corresponds to the angle between the stops and therefore with the position of the pointer of the receiver dial. Ordinarily the shell fuse is set at "safe" before the shell is inserted into the apparatus but any other given position could be used as a datum on which the "setting" given by the apparatus would be superimposed.

Before inserting the shell into the fuse-setting apparatus, the rotatable sleeve 15 is therefore returned by moving the driving lever in the appropriate direction, to the starting position, that is to say a position on which the lug 26 mounted on the rotatable sleeve engages the fixed stop 27 on the casing. The position in which the stop 28 on the worm-wheel 30 has been placed will then determine the extent to which the rotatable sleeve can turn to effect "setting" and consequently assuming that the fuse of the shell is in the safe position when inserted into the fuse-setting apparatus it is sufficient for the rotatable sleeve to be turned through the angle between the two stops to cause the movable fuse-ring to be moved to the desired angular position.

In order to prevent the driving-lever 25 from being operated until the gripping-lever 37 has been operated and has caused the shell to be gripped by the eccentric cam 46 and also has caused the movable fuse-ring to be gripped by the knives 16 through the sliding movement of the slidable sleeve 18, a catch is provided on the control-handle 51. This catch comprises an arm 52 (Figures 1 and 2) formed on a member 152 which is capable of a limited degree of rotation on the spindle 33 and arranged to be turned by the control-handle 51 through a lost-motion connection. The member 152 is journalled in the boss 57 of the control handle 51 and retained in position by a thrust bracket 157 which engages in a circumferential slot in the boss of the member 152. The lost-motion connection comprises a slot 55 (see also Figure 8) formed in the member 152 and a projection 56 which is formed on the boss 57 of the control-handle 51. Thus until the handle 51 has been moved a certain distance (18° in the construction shown) the part 52 does not move. A spring 53 (Figure 1) urges the end of the catch in a clockwise direction as seen in Figure 2, and when the parts are in the position shown in Figure 2, the end of the catch 52 engages a shoulder formed by a bracket 54 and a ledge 65 on the driving lever 25. This engagement continues during the initial movement of the control-handle 51 (i. e. in the direction of the arrow, Figure 2) so that the driving-lever 25 cannot be operated until the knives 16 have properly gripped the movable fuse-ring.

As soon as the control handle 51 is pulled sufficiently far in the direction of the arrow, Figure 2, to effect the engagement of the knives 16 and the locking of the shell within the support 11, the catch 52 is moved clear of the bracket 54 and ledge 65 whereby the driving handle 25 can then be moved in the direction of the arrow to set the fuse. As this handle is pulled the other should then be released so that it can fly back under the action of a spring 64, Figure 3, which is connected between the casing and the lever 37. When the handle 25 is moved back (after setting) to the position shown in Figure 2, the ledge 65 thereon passes beneath the arm 52 which it turns against the influence of the torsion spring 53 and as the handle 25 reaches its final position the arm 52 snaps down again on the bracket 54.

In order to facilitate the assembly of the various parts of the gripping-device the latter is made in sections which are secured to the rotatable sleeve 15. This assembly is clearly shown in Figures 5, 6 and 7 and is suitable for a powder fuse. Another gripping device for a clockwise fuse is shown in Figures 5a, 6a and 7a. Like parts in the two kinds of gripping devices are marked with like reference numbers and the following description applies to both kinds of gripping devices. The knives 16 are slidable between the two parts 58 and 59 which are located relatively to each other by dowels 60. The part 59 is dowelled into the rotating sleeve 15 by dowels 61 and the two parts 58 and 59 are secured to the rotatable sleeve 15 by bolts 62. The slidable sleeve 18 frictionally engages the parts 58 and 59 so as to be slidable thereon and rotatable therewith.

What we claim as our invention and desire to secure by Letters Patent is:

1. In a fuse-setting apparatus of the kind having a gripping device comprising sharp gripping members adapted to engage and grip the movable element of a fuse, the combination of a driving lever operably coupled to the gripping device to effect angular movement thereof, a control lever, means operably coupled to the control lever and adapted on movement of the latter to hold a shell against angular movement and to move the gripping members inwards so that they can grip the movable fuse-element, said means including a wedge-like slidable member adapted on movement in one direction along the axis of rotation of the gripping device, to force the sharp gripping members inwards, a catch to prevent operative movement of the driving lever and a lost motion operative connection between the catch and the control lever, whereby the catch is released only after the control lever has moved a sufficient distance to cause the shell to be held and the movable fuse-element to be gripped.

2. In a fuse setting apparatus of the kind having a gripping device comprising sharp gripping members adapted to engage and grip the movable element of a fuse, the combination of a driving lever operably coupled to the gripping device to effect angular movement thereof, a control lever, means operably coupled to the control lever and adapted on movement of the latter to hold a shell against angular movement and to move the gripping members inwards so that they can grip the movable fuse-element, said means including an internally coned slidable ring, a cam movable with the control lever, a bellcrank lever having a forked arm to move the ring axially, the other arm of the bellcrank being adapted to engage said cam, whereby on actuation of the control lever the cam causes movement of the bellcrank lever, the coned ring being adapted on movement in one direction along the axis of rotation of the gripping device, to force the sharp gripping members inwards, a catch to prevent operative movement of the driving lever and a lost motion operative connection between the catch and the control lever, whereby the catch is released only after the control lever has moved a sufficient distance to cause the shell to be held and the movable fuse-element to be gripped.

3. In a fuse-setting apparatus of the kind having a gripping device comprising sharp gripping members adapted to engage and grip the movable element of a fuse, the combination of a driving lever operably coupled to the gripping device to effect angular movement thereof, a control lever, means to hold a shell against movement comprising an angularly movable eccentric cam having components of movement in the general direction of the longitudinal axis of a shell and an extensible coupling connecting the eccentric cam and the control-lever to permit further movement of the control-lever after said cam has effectively engaged a shell, means to move the gripping members inward so that they can grip the movable fuse-element, said last means being operatively connected to the control lever and including wedge-like slidable member adapted on movement in one direction along the axis of rotation of the gripping device, to force the sharp gripping members inwards, a catch to prevent operative movement of the driving lever and a lost motion operative connection between the catch and the control lever, whereby the catch is released only after the control lever has moved a sufficient distance to cause the shell to be held and the movable fuse-element to be gripped.

4. In a fuse-setting apparatus of the kind having a gripping device comprising sharp gripping members adapted to engage and grip the movable element of a fuse, the combination of a driving lever operably coupled to the gripping device to effect angular movement thereof, a control lever, means to hold a shell against movement comprising an angularly movable eccentric cam having components of movement in the general direction of the longitudinal axis of a shell and an extensible coupling connecting the eccentric cam and the control-lever to permit further movement of the control-lever after said cam has effectively engaged a shell, to move the gripping members inwards so that they can grip the movable fuse-element, said means including an internally coned slidable ring, a cam movable with the control-lever, a bellcrank lever having a forked arm to move the ring axially, the other arm of the bellcrank being adapted to engage said cam, whereby on actuation of the control-lever the cam causes movement of the bellcrank lever, the coned ring being adapted on movement in one direction along the axis of rotation of the gripping device to force the sharp gripping members inwards, a catch to prevent operative movement of the driving lever and a lost motion operative connection between the catch and the control-lever, whereby the catch is released only after the control-lever has moved a sufficient distance to cause the shell to be held and the movable fuse-element to be gripped.

5. A fuse-setting apparatus as claimed in claim 3, wherein the extensible coupling is located between the said eccentric cam and the said bellcrank lever.

6. A fuse-setting apparatus as claimed in claim 4, wherein the extensible coupling is located between the said eccentric cam and the said bellcrank lever.

7. In a fuse-setting apparatus of the kind having a gripping device comprising sharp gripping members adapted to engage and grip the movable element of a fuse and having sloping surfaces whereby they are forced inwardly, the combination of a driving lever operably coupled to the gripping device to effect angular movement thereof, a control lever, means operably coupled to the control lever and adapted on movement of the latter to hold a shell against angular movement and to move the gripping members inwards so that they can grip the movable fuse-element, said means including an internally coned slidable ring, a cam movable with the control lever, a bellcrank lever having a forked arm to move the ring axially, the other arm of the bellcrank being adapted to engage said cam, whereby on actuation of the control lever the cam causes movement of the bellcrank lever, the coned ring being adapted on movement in one direction along the axis of rotation of the gripping device to force the sharp gripping members inwards, a catch to prevent operative movement of the driving lever and a lost motion operative connection between the catch and the control lever, whereby the catch is released only after the control lever has moved a sufficient distance to cause the shell to be held and the movable fuse-element to be gripped.

ALFRED HENRY MUSSON.
VALENTINE PEARCE HARVEY.